(12) United States Patent
Hioki et al.

(10) Patent No.: US 11,209,320 B2
(45) Date of Patent: Dec. 28, 2021

(54) TEMPERATURE SENSOR

(71) Applicants: Murata Manufacturing Co., Ltd., Nagaokakyo (JP); OSAKA UNIVERSITY, Suita (JP)

(72) Inventors: Yasunori Hioki, Nagaokakyo (JP); Tsuyoshi Sekitani, Suita (JP); Takafumi Uemura, Suita (JP); Tomoaki Onoue, Nagaokakyo (JP)

(73) Assignees: MURATA MANUFACTURING CO., LTD., Nagaokakyo (JP); OSAKA UNIVERSITY, Suita (JP)

( * ) Notice: Subject to any disclaimer, the term of this patent is extended or adjusted under 35 U.S.C. 154(b) by 375 days.

(21) Appl. No.: 16/508,497

(22) Filed: Jul. 11, 2019

(65) Prior Publication Data

US 2019/0331536 A1    Oct. 31, 2019

Related U.S. Application Data

(63) Continuation of application No. PCT/JP2017/039172, filed on Oct. 30, 2017.

(30) Foreign Application Priority Data

Jan. 30, 2017   (JP) .............................. JP2017-014178

(51) Int. Cl.
*G01K 7/22*    (2006.01)
*H01C 7/04*    (2006.01)
(Continued)

(52) U.S. Cl.
CPC .............. *G01K 7/22* (2013.01); *G01K 1/024* (2013.01); *G01K 1/026* (2013.01); *H01C 7/04* (2013.01);
(Continued)

(58) Field of Classification Search
CPC .......... G01K 7/22; G01K 1/026; G01K 1/024; H01C 7/049; H01C 7/04; H01C 7/06553
See application file for complete search history.

(56) References Cited

U.S. PATENT DOCUMENTS 3,598,762 A  *  8/1971  Futaki et al. .......... H01C 7/047
                                                    252/520.4
5,313,110 A      5/1994  Watanabe et al.
(Continued)

FOREIGN PATENT DOCUMENTS

JP      S5539456 A      3/1980
JP      S6360502 A      3/1988
(Continued)

OTHER PUBLICATIONS

International Search Report issued in PCT/JP2017/039172, dated Jan. 30, 2018.
(Continued)

*Primary Examiner* — Lisa M Caputo
*Assistant Examiner* — Philip L Cotey
(74) *Attorney, Agent, or Firm* — Arent Fox LLP (57) ABSTRACT

A temperature sensor that includes an organic-inorganic composite negative temperature coefficient thermistor and a transistor. The organic-inorganic composite negative temperature coefficient thermistor includes a thermistor layer which includes spinel-type semiconductor ceramic composition powder containing Mn, Ni and Fe and an organic polymer component, and a pair of electrode layers. The semiconductor ceramic composition powder has a molar ratio of Mn to Ni of 85/15≥Mn/Ni≥65/35 and a Fe content of 30 parts by mole or less when a total molar amount of Mn and Ni is regarded as 100 parts by mole, and has a peak with a local maximum value of around 29° to 31° in its X-ray diffraction pattern, a half width of which peak is 0.15 or
(Continued)

more. The transistor is electrically connected with either one of the pair of electrode layers.

20 Claims, 4 Drawing Sheets

(51) Int. Cl.
   *G01K 1/024* (2021.01)
   *G01K 1/02* (2021.01)
   *H01C 17/065* (2006.01)
(52) U.S. Cl.
   CPC ....... *H01C 7/049* (2013.01); *H01C 17/06553* (2013.01)

(56) References Cited

U.S. PATENT DOCUMENTS

| | | | |
|---|---|---|---|
| 8,183,973 B2* | 5/2012 | Ryu | H01C 7/043 338/22 SD |
| 10,302,506 B2 | 5/2019 | Sekitani et al. | |
| 2010/0259358 A1* | 10/2010 | Ryu | H01C 7/043 338/22 SD |
| 2013/0187748 A1* | 7/2013 | Sha | H01C 7/008 338/22 R |
| 2013/0235507 A1* | 9/2013 | Aikawa | C04B 35/58 361/234 |
| 2015/0070127 A1* | 3/2015 | Ikeda | H01C 7/04 338/22 R |
| 2017/0176262 A1 | 6/2017 | Sekitani et al. | |
| 2018/0164162 A1 | 6/2018 | Hioki et al. | |

FOREIGN PATENT DOCUMENTS

| | | |
|---|---|---|
| JP | H04291811 A | 10/1992 |
| JP | 2004031795 A | 1/2004 |
| JP | 2004311588 A | 11/2004 |
| JP | 2005150146 A | 6/2005 |
| JP | 2010237065 A | 10/2010 |
| WO | 2015119205 A1 | 8/2015 |
| WO | 2017022373 A1 | 2/2017 |

OTHER PUBLICATIONS

Written Opinion of the International Searching Authority issued in PCT/JP2017/039172, dated Jan. 30, 2018.

* cited by examiner

TEMPERATURE SENSOR

CROSS-REFERENCE TO RELATED APPLICATIONS

The present application is a continuation of International Application No. PCT/JP2017/039172, filed Oct. 30, 2017, which claims priority to Japanese Patent Application 2017-014178 filed Jan. 30, 2017, the entire content of each of which are incorporated herein by reference.

FIELD OF THE INVENTION

The present disclosure relates to a temperature sensor.

BACKGROUND OF THE INVENTION

Temperature thermistors such as positive temperature coefficient thermistors (PTC thermistors) and negative temperature coefficient thermistors (NTC thermistors) and the like are widely used in applications such as temperature compensation and temperature detection. Among them, a temperature sensors having flexibility apply to a wide range of fields, such as various medical fields, and thus development of temperature sensor have been advanced.

WO 2015/119205 discloses a resin composition for a temperature sensor comprising an acrylic polymer obtained by copolymerizing a first acrylic monomer represented by a general formula $CH_2CHCOOX_1$ and a second acrylic monomer represented by a general formula $CH_2CHCOOX_2$, and conductive particles dispersed in the acrylic polymer. WO 2015/119205 also discloses an element for the temperature sensor that includes two electrodes and the resin composition for the temperature sensor sandwiched between the two electrodes; and a temperature sensor comprising this element for the temperature sensor and a transistor connected to either one of the electrodes.

SUMMARY OF THE INVENTION

The resin composition for the temperature sensor disclosed in WO 2015/119205, however, exhibits a low resistance value at a low temperature since the conductive particles contact each other at the low temperature. On the other hand, at a temperature exceeding a certain temperature, the polymer in the resin composition is thermally expanded, and a gap is thereby created between the conductive particles, resulting in an increase in the resistance value. It is possible to measure a temperature change by use of the composition of WO 2015/119205 which has a property of changing its resistance value by expansion and shrinkage of the polymer with a temperature in this manner. However, since the polymer deforms little by little with repeated expansions and shrinkages and does not completely return to its original form, the arrangement of the conductive particles dispersed in the polymer also changes gradually. Therefore, the resin composition for the temperature sensor of WO 2015/119205 tends to have a gradual change in its resistance value with repeated use, and thereby exhibits hysteresis.

In a case of the resin composition that uses expansion and the shrinkage of the polymer, the temperature at which the polymer used exhibits large expansion and shrinkage is generally a temperature specific to the polymer itself such as a softening point and a crystalline melting point thereof. Therefore, when the composition of the polymer is fixed, the temperature measurement is possible only in a specific temperature range. It is necessary to change the composition of the polymer in order to change the temperature at which the temperature measurement is possible (response temperature).

In addition, in a case of the resin composition for the temperature sensor using the expansion and the shrinkage of the polymer, the composition of the polymer is limited in order for a desired response temperature to be obtained, and thus, it may be difficult to select a polymer having a good flexibility resistance, which may lead to a lower flexibility resistance.

Furthermore, in a case of measuring a temperature by use of physical changes such as the expansion and the shrinkage of the polymer, a physical load is applied to a bonding portion between the temperature sensor and an electrode wire, and a delamination at the bonding portion may thereby occur upon repeated measurements of the temperature.

An objective of the present disclosure is to provide a temperature sensor having a higher repetitive accuracy of the resistance value, a wider range of the measurement temperature and a higher adhesion reliability to the electrode wire, and achieving a better flexibility resistance.

The present inventors have found that it becomes possible to obtain a temperature sensor having a higher repetitive accuracy of the resistance value, a wider range of the measurement temperature and a higher adhesion reliability to the electrode wire and which achieves a better flexibility resistance by use of, as an element for a temperature sensor, an organic-inorganic composite negative temperature coefficient thermistor including a thermistor layer which includes a semiconductor ceramic composition powder having NTC characteristics and an organic polymer component, and a pair of electrode layers.

According to a first aspect of the present disclosure, a temperature sensor is provided, the sensor including an organic-inorganic composite negative temperature coefficient thermistor and a transistor, wherein the organic-inorganic composite negative temperature coefficient thermistor includes: a thermistor layer which includes spinel-type semiconductor ceramic composition powder containing Mn, Ni and Fe and an organic polymer component, and a pair of electrode layers. In accordance with this first aspect of the present disclosure, the semiconductor ceramic composition powder has a molar ratio of Mn to Ni of 85/15≥Mn/Ni≥65/35 and a Fe content of 30 parts by mole or less when a total molar amount of Mn and Ni is regarded as 100 parts by mole, the semiconductor ceramic composition powder has a peak with a local maximum value of around 29° to 31° in its X-ray diffraction pattern, a half width of which peak is 0.15 or more, and wherein the transistor is electrically connected with either one of the pair of electrode layers of the organic-inorganic composite negative temperature coefficient thermistor.

According to the present disclosure, a temperature sensor can have a higher repetitive accuracy of the resistance value, a wider range of the measurement temperature and a higher adhesion reliability to the electrode wire and achieves a better flexibility resistance.

DETAILED DESCRIPTION OF THE INVENTION

Hereinafter, a temperature sensor and a method for manufacturing the temperature sensor according to one embodiment of the present disclosure will be described in detail with reference to the drawings. However, shapes, arrangements and the like of the temperature sensor and each component thereof according to the present disclosure are not limited to the embodiment described below and the configurations illustrated in the drawings.

[Temperature Sensor]

Figure 1:
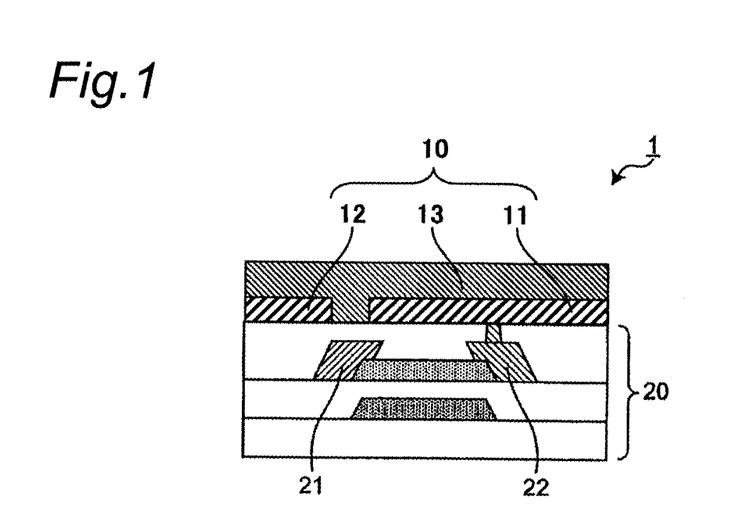
FIG. 1 is a schematic cross-sectional view of a temperature sensor according to one embodiment of the present disclosure.

FIG. 1 illustrates a schematic cross-sectional diagram of a temperature sensor according to one embodiment of the present disclosure. The temperature sensor 1 shown in FIG. 1 includes an organic-inorganic composite negative temperature coefficient thermistor (hereinafter also referred to as "organic-inorganic composite NTC thermistor") 10 and a transistor 20. The organic-inorganic composite NTC thermistor includes: a thermistor layer 13 which includes a spinel-type semiconductor ceramic composition powder containing Mn, Ni and Fe and an organic polymer component; and a pair of electrode layers 11 and 12. Details of the organic-inorganic composite NTC thermistor 10 and the transistor 20 will be described later.

The organic-inorganic composite NTC thermistor 10 according to the present embodiment serves as an element for the temperature sensor since the semiconductor ceramic composition powder contained in the thermistor layer 13 has a temperature-sensitive function (NTC characteristics, a property of decreasing the resistance value as the temperature rises). The semiconductor ceramic composition is characterized by good repetitive accuracy of the resistance value and its exhibition of no hysteresis. The organic polymer component contained in the thermistor layer 13 is different from a polymer contained in an organic PTC thermistor in that the organic polymer component does not exhibit expansion and shrinkage with a change in temperature. Therefore, the organic-inorganic composite NTC thermistor 10 in the present embodiment has an advantage in that it has higher repetitive accuracy of the resistance value and exhibits no hysteresis.

The semiconductor ceramic composition in the present embodiment is characterized by having a resistance value which varies over a wide range of temperature. Therefore, the temperature sensor according to the present embodiment has an advantage, by use of the semiconductor ceramic composition having a single composition, that it can measure a temperature over a wide temperature range.

The organic polymer component contained in the thermistor layer 13 has no particular limitation in its composition as long as it has a function of holding the semiconductor ceramic composition powder having a temperature-sensitive function. Therefore, a design of the organic polymer component has a wide variety of choices. A design of a soft organic polymer component having flexibility resistance makes it possible for the temperature sensor to have higher flexibility resistance than the organic PTC thermistor which has limited choice of polymers.

Since the composition of the organic polymer component is not particularly limited as described above, it is possible to design the organic polymer component which allows good adhesion to an electrode wire (such as an electrode wire for connecting with the transistor). Therefore, a physical load at a bonding portion between the temperature sensor and the electrode wire can be reduced, and thereby an adhesion reliability to the electrode wire can be improved.

In the temperature sensor 1 according to the present embodiment, the transistor 20 is in electrical connection with either one of the electrode layers of the organic-inorganic composite NTC thermistor 10. In an example shown in FIG. 1, the transistor 20 is in electrical connection with the electrode layer 11 of the organic-inorganic composite NTC thermistor 10.

As the resistance value of the organic-inorganic composite NTC thermistor 10 is changed in the temperature sensor 1, a value of a current flowing through the transistor 20 is changed, and a signal corresponding to the current value is output to an outside. Specifically, as the resistance value of the organic-inorganic composite NTC thermistor 10 is changed, a value of a current flowing between a source electrode 21 and a drain electrode 22 is changed. For example, as the resistance value of the organic-inorganic composite NTC thermistor 10 is decreased by an increase in temperature, the value of the current flowing between the source electrode 21 and the drain electrode 22 is increased. A change in the temperature can be determined by a measurement of this current value.

Figure 2:
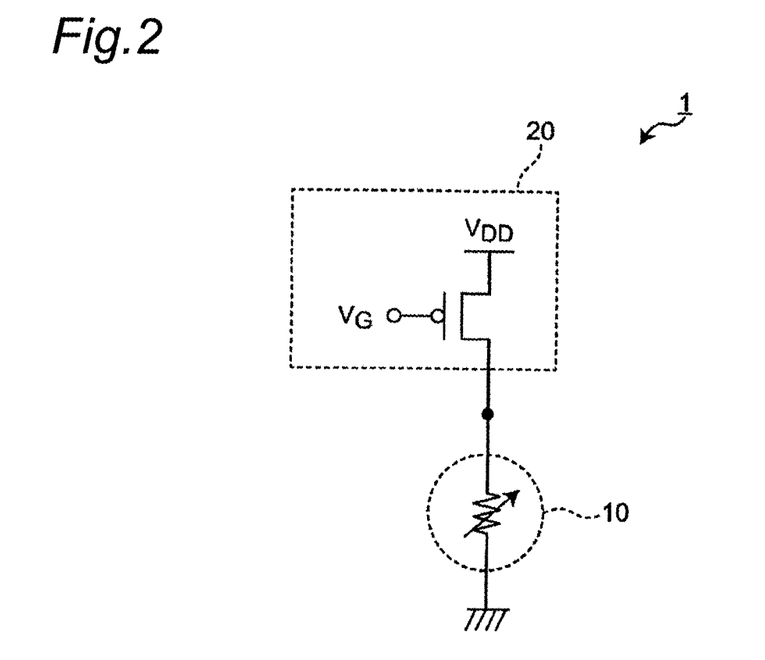
FIG. 2 is a circuit diagram of a temperature sensor according to one embodiment of the present disclosure.

The temperature sensor 1 according to the present embodiment can also be represented by a circuit diagram shown in FIG. 2, for example. The temperature sensor 1 shown in FIG. 2 includes the organic-inorganic composite NTC thermistor 10 and the transistor 20 connected with the organic-inorganic composite NTC thermistor 10. In an example shown in FIG. 2, a voltage output to the outside can be represented by formula (1) below.

$$V_{EN} = V_{DD} \times (R_t/(R_g + R_t)) \quad (1)$$

In the formula, $V_{EN}$ is the voltage output to the outside; $V_{DD}$ is a drain voltage; $R_g$ is a resistance value of the transistor 20; and $R_t$ is the resistance value of the organic-inorganic composite NTC thermistor 10. As the gate voltage $V_G$ is changed, the resistance value $R_g$ of the transistor 20 is changed, and as a result, the voltage $V_{EN}$ output to the outside is changed according to formula (1). That is, the temperature sensor 1 can change the voltage $V_{EN}$ output to the outside by changing the gate voltage $V_G$ of the transistor 20.

In the temperature sensor according to the present embodiment, the transistor serves as a switch. Use of the transistor as the switch has such an advantage that the number of wires can be reduced.

Figure 3:
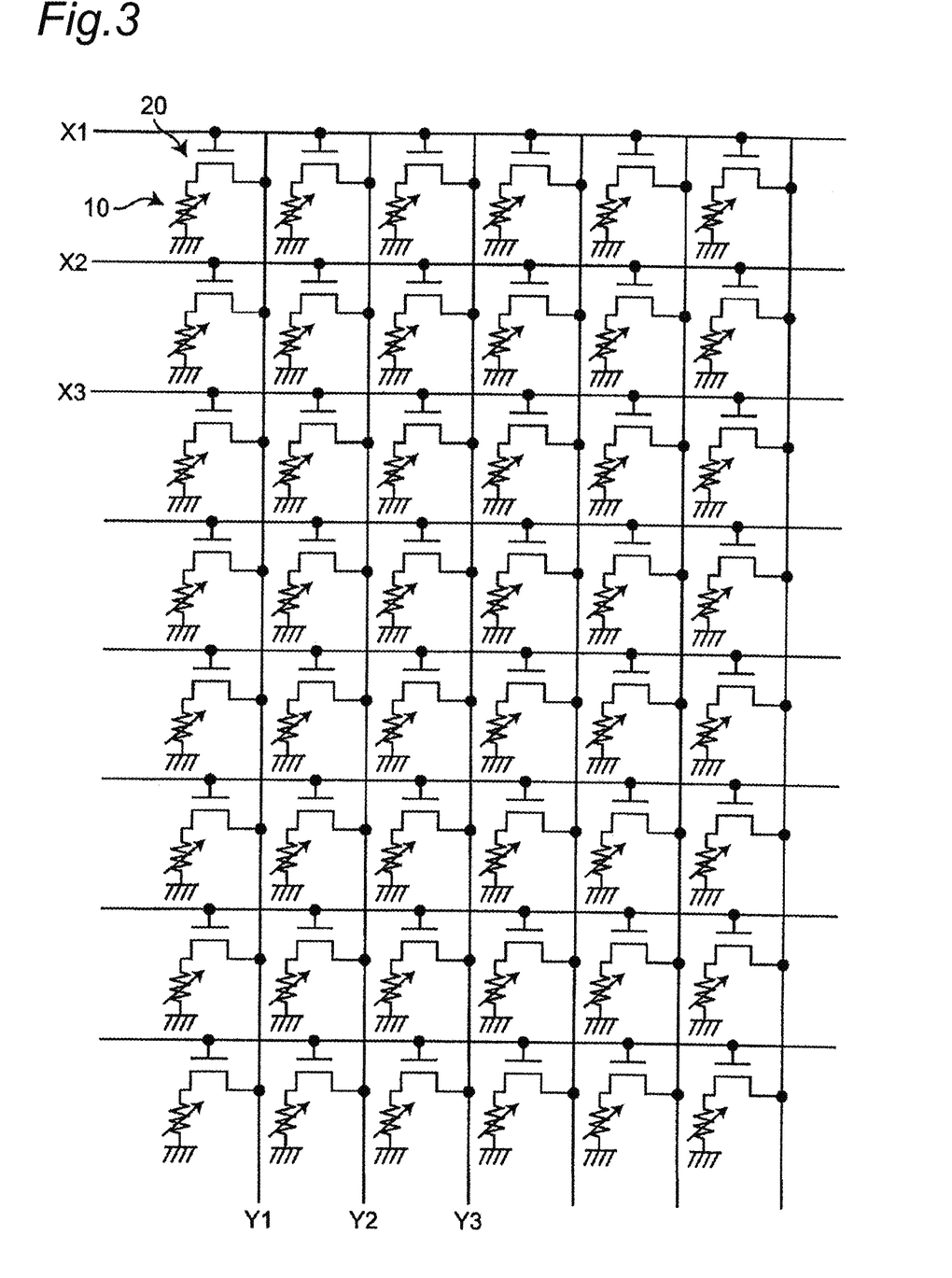
FIG. 3 is a schematic diagram illustrating a configuration example in a case where a plurality of organic-inorganic composite negative temperature coefficient thermistors and a plurality of transistors are arranged in a matrix form.

The temperature sensor according to the present embodiment may include one organic-inorganic composite negative temperature coefficient thermistor and one transistor. However, the temperature sensor according to the present embodiment preferably includes a plurality of organic-inorganic composite NTC thermistors and a plurality of transistors. When the temperature sensor includes a plurality of the organic-inorganic composite NTC thermistors and a plurality of the transistors, the temperature sensor further includes a substrate, and a plurality of x-electrodes and a plurality of y-electrodes arranged crosswise in a matrix form on the substrate. Each one of the organic-inorganic composite negative temperature coefficient thermistors and each one of the transistors are respectively arranged in the vicinity of each one of intersections of the x-electrodes and the y-electrodes. Each of the transistors is electrically connected with either one of the electrode layers of one of the organic-inorganic composite negative temperature coefficient thermistors. Each of the transistors is electrically connected with one of the x-electrodes and one of the y-electrodes. FIG. 3 schematically shows a configuration example where a plurality of the organic-inorganic composite negative temperature coefficient thermistors 10 and a plurality of the transistors 20 are arranged in a matrix form. In FIG. 3, X1, X2, X3 . . . indicate the x-electrodes, and Y1, Y2, Y3 . . . indicate the y-electrodes. It becomes possible to switch each element and read temperatures at each element by the configuration of the temperature sensor with a plurality of the organic-inorganic composite negative temperature coefficient thermistors 10 and a plurality of the transistors 20 being arranged in a matrix form in this manner. Adoption of such active matrix system makes it possible to reduce the number of the wires, which can lead to an achievement of the temperature sensor with high density and high definition. In addition, the adoption of the active matrix system also makes it possible to reduce the number of readout circuits for sensor signals similarly to the reduction of the number of the wires, which can lead to a miniaturization of the temperature sensor.

The temperature sensor may further include a reading unit for reading a change in the resistance value of the organic-inorganic composite negative temperature coefficient thermistor and a radio communication unit for transmitting information read by the reading unit. Since the temperature sensor includes the transistor, it is possible to miniaturize a reading circuit for reading the change in the resistance value, and transmit measured temperature data to a computer or the like by radio communication. A known technique may be suitably adopted as the reading unit and the radio communication unit. For example, the reading unit and the radio communication unit may be a readout circuit module connected with the organic-inorganic composite negative temperature coefficient thermistor. The readout circuit module can transmit the read-out information such as the temperature data to a computer or the like which mounts Bluetooth (registered trademark) module or the like.

Figure 4:
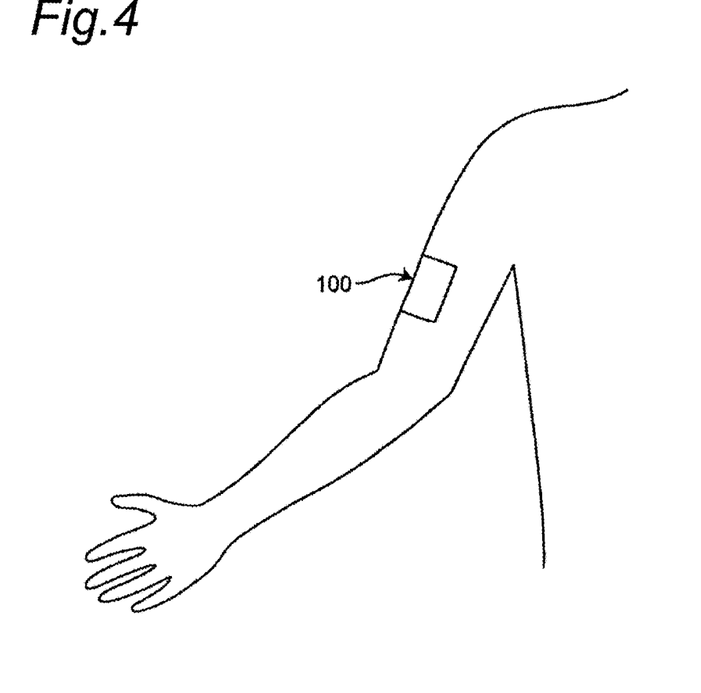
FIG. 4 is a diagram illustrating an usage example of a temperature sensor according to one embodiment of the present disclosure.

Since the temperature sensor according to the present embodiment has good flexibility, it can be wound on a human body as shown in FIG. 4, for example, and can be used to measure a temperature distribution on a surface of the body. The temperature sensor is indicated by a reference numeral 100 in FIG. 4.

(Organic-Inorganic Composite Negative Temperature Coefficient Thermistor)

The organic-inorganic composite NTC thermistor in the present embodiment will be described hereinafter. The organic-inorganic composite NTC thermistor according to one embodiment of the present disclosure includes: the thermistor layer which includes the spinel-type semiconductor ceramic composition powder containing Mn, Ni and Fe and the organic polymer component; and a pair of the electrode layers. In a configuration example shown in FIG. 1, the organic-inorganic composite NTC thermistor 10 includes the electrode layer 11 and the electrode layer 12 both laminated on the transistor 20, and the thermistor layer 13 laminated thereon.

Figure 5A:
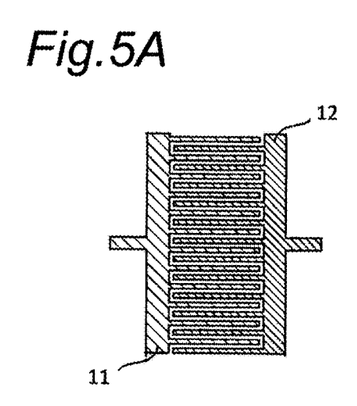
FIGS. 5A to 5C are schematic diagrams illustrating a configuration example of an organic-inorganic composite negative temperature coefficient thermistor.
Figure 5B:
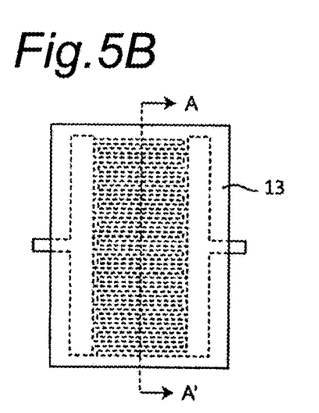
Figure 5C:
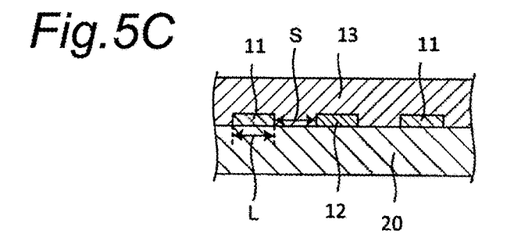

FIGS. 5A to 5C schematically show a structure of the organic-inorganic composite NTC thermistor shown in FIG. 1. FIG. 5A is a plan view showing the arrangement of a pair of the electrode layers 11 and 12 of the organic-inorganic composite NTC thermistor 10. FIG. 5B is a plan view showing the arrangement of the thermistor layer 13 disposed on the electrode layers 11 and 12 shown in FIG. 5A. FIG. 5C is a partial enlarged view of a cross section taken along a line A-A' in FIG. 5B. In an example shown in FIG. 5C, a pair of the electrode layers 11 and 12 is disposed on the transistor 20. A pair of the electrode layers 11 and 12 may have a comb shape as shown in FIG. 5A; however, the shape of the electrode layers in the present disclosure is not limited to such a shape. When the electrode layers 11 and 12 have the comb shape, a pair of the electrode layers 11 and 12 can be formed at the same time by one-time printing of electrode layer paste on the transistor 20, and thus, the number of processes can be reduced. The electrode layers 11 and 12 respectively have a plurality of electrode lines. The electrode lines of one electrode layer (the electrode layer 11) and the electrode lines of the other electrode layer (the electrode layer 12) are arranged alternately and apart from each other, thereby the electrode layer 11 and the electrode layer 12 are opposite to each other.

The thermistor layer 13 is disposed on the electrode layers 11 and 12 shown in FIG. 5A. The thermistor layer 13 is located between the electrode lines of one electrode layer (the electrode layer 11) and the electrode lines of the other electrode layer (the electrode layer 12) as shown in FIG. 5C. The organic-inorganic composite NTC thermistor can be obtained by the arrangement of the electrode layers 11 and 12 and the thermistor layer 13 in this manner.

The thermistor layer includes the spinel-type semiconductor ceramic composition powder containing Mn, Ni and Fe and the organic polymer component. In the semiconductor ceramic composition powder, a molar ratio of Mn to Ni is 85/15≥Mn/Ni≥65/35, and a Fe content is 30 parts by mole or less when a total molar amount of Mn and Ni is regarded as 100 parts by mole. Since the semiconductor ceramic composition powder in the present embodiment has the above-described composition, the semiconductor ceramic composition powder has a spinel structure and include a small amount of heterogeneous phase. The semiconductor ceramic composition powder in the present embodiment preferably includes substantially no heterogeneous phase. The above-described semiconductor ceramic composition powder has high B constant. Therefore, the organic-inorganic composite NTC thermistor having high B constant value can be obtained even when the content of the semiconductor ceramic composition powder in the thermistor layer is small. In addition, since the semiconductor ceramic composition powder includes small amount of the heterogeneous phase, the organic-inorganic composite NTC thermistor having small variation in B constant value can be obtained.

Preferably, the semiconductor ceramic composition powder further includes one or more selected from a group consisting of Co, Ti and Al. In this case, the sum of the contents of Co, Ti and Al is preferably 2.0 parts by mole to 60 parts by mole when the total molar amount of Mn and Ni is regarded as 100 parts by mole. When the semiconductor ceramic composition powder further includes one or more selected from a group consisting of Co, Ti and Al, the organic-inorganic composite NTC thermistor having desired thermistor characteristics with large B constant and small variation in B constant can be obtained. The semiconductor ceramic composition powder may further include Zn (e.g.

ZnO), Cu (e.g. CuO and $CuCO_3$), Zr (e.g. $ZrO_2$) and the like in addition to the above-described metal elements.

The semiconductor ceramic composition powder preferably has an average particle diameter of 2 μm or less. When the average particle diameter of the semiconductor ceramic composition powder is within the above-described range, a connection between the semiconductor ceramic composition powders can be formed efficiently in the thermistor layer, and a conductive path (percolation path) can be formed efficiently in the thermistor layer. As a result, the organic-inorganic composite NTC thermistor having excellent thermistor characteristics can be obtained even when the content of the semiconductor ceramic composition powder in the thermistor layer is small. Furthermore, when the average particle diameter of the semiconductor ceramic composition powder is within the above-described range, the variation in B constant can be reduced. Specifically, the organic-inorganic composite NTC thermistor having B constant of 2,500 K or more and the variation in B constant of within ±2.5% can be obtained, for example. A method of calculating the variation in B constant will be described later.

In addition, when the average particle diameter of the semiconductor ceramic composition powder is 2 μm or less, the content of the semiconductor ceramic composition powder in the thermistor layer can be reduced, and thus, the content of the organic polymer component in the thermistor layer can be increased. As a result, the flexibility of the thermistor layer is improved. Therefore, even when the temperature sensor is bent, an occurrence of cracks or the like in the thermistor layer can be prevented, while the temperature sensor can still serve as the temperature sensor. Furthermore, when the average particle diameter is 2 μm or less, a thickness of the thermistor layer can be decreased, and thus, the flexibility of the thermistor layer can be furthermore improved. In addition, when the average particle diameter is 2 μm or less, it is possible to form the thermistor layer by a printing technique such as screen printing. More preferably, the semiconductor ceramic composition powder has an average particle diameter of 0.4 μm to 1.5 μm. As the semiconductor ceramic composition powder in the present embodiment, one kind of powder having a predetermined average particle diameter may be used, or two or more kinds of powder having different average particle diameters may be used in combination. The semiconductor ceramic composition powder in the present embodiment may have a unimodal particle diameter distribution, or may have a multi-peak particle diameter distribution such as a bimodal particle diameter distribution. The average particle diameter of the semiconductor ceramic composition powder present in the thermistor layer can be calculated by cutting the organic-inorganic composite NTC thermistor to expose a cross section of the thermistor layer, observing the exposed surface with a scanning electron microscope (SEM), and performing statistical analysis.

The semiconductor ceramic composition powder in the present embodiment can be obtained by subjecting a raw material mixture to a heat treatment at a relatively low temperature as described later. Therefore, the semiconductor ceramic composition powder in the present embodiment tends to have lower hardness relative to a sintered body obtained by conventional high-temperature calcination. Thus, the semiconductor ceramic composition powder in the present embodiment can achieve the average particle diameter of 2 μm or less by grinding. The semiconductor ceramic composition powder in the present embodiment can be distinguished from the sintered body obtained by the conventional high-temperature calcination by, for example, XRD measurement. The semiconductor ceramic composition powder in the present embodiment has a peak with a local maximum value at around 29° to 31° in its X-ray diffraction pattern. This peak corresponds to (220) plane of a spinel-type crystal structure. Hereinafter, this peak is also referred to as "(220) plane peak." A half-value width of the (220) plane peak of the semiconductor ceramic composition powder in the present embodiment tends to be larger than that of the sintered body obtained by the conventional high-temperature calcination, and may be 0.15 or more, for example. On the other hand, the half-value width of the (220) plane peak of the sintered body obtained by the conventional high-temperature calcination tends to be less than 0.15.

The semiconductor ceramic composition powder preferably has a specific surface area of 2 $m^2/g$ to 12 $m^2/g$. When the specific surface area is 2 $m^2/g$ or more, the connection between the semiconductor ceramic composition powders can be formed efficiently in the thermistor layer, and the conductive path (percolation path) can be formed efficiently in the thermistor layer. As a result, the organic-inorganic composite NTC thermistor having excellent thermistor characteristics can be obtained even when the content of the semiconductor ceramic composition powder in the thermistor layer is small. Furthermore, when the specific surface area is 2 $m^2/g$ or more, the variation in B constant can be reduced. Specifically, the organic-inorganic composite NTC thermistor having B constant of 2,500 K or more and the variation in B constant of within ±2.5% can be obtained, for example. When the specific surface area is 12 $m^2/g$ or less, the semiconductor ceramic composition powder can be efficiently dispersed in the thermistor layer, and an occurrence of a coarse aggregate can be prevented. The specific surface area of the semiconductor ceramic composition powder contained in the thermistor layer can be evaluated by causing the organic polymer component in the thermistor layer to disappear with a heat treatment or the like, and measuring the specific surface area of the semiconductor ceramic composition powder which is a residue with a gas adsorption method.

A volume percentage of the semiconductor ceramic composition powder in the thermistor layer (hereinafter also referred to as "PVC") is preferably 30% by volume to 70% by volume. When the volume percentage is 30% by volume or more, the semiconductor ceramic composition powders have efficient connection with each other within the thermistor layer to form the conductive path, and thus, the organic-inorganic composite NTC thermistor having furthermore higher B constant can be obtained. In the present embodiment, with the small average particle diameter of the semiconductor ceramic composition powder of 2 μm or less, the organic-inorganic composite NTC thermistor having B constant of 2,500 K or more can be obtained even when the volume percentage of the semiconductor ceramic composition powder is 30% by volume. The higher the volume percentage of the semiconductor ceramic composition powder is, the lower the resistance value of the organic-inorganic composite NTC thermistor can be. When the volume percentage of the semiconductor ceramic composition powder is 70% by volume or less, the flexibility of the thermistor layer can be furthermore improved. The value of PVC can be calculated by use of the following formula:

$$PVC\ (\%) = \frac{\begin{pmatrix} \text{volume of semiconductor ceramic} \\ \text{composition powder} \end{pmatrix}}{\begin{pmatrix} \text{volume of semiconductor ceramic} \\ \text{composition powder} \end{pmatrix} + (\text{volume of organic polymer component})} \times 100$$

The volume of the semiconductor ceramic composition powder and the volume of the organic polymer component can be calculated on the basis of, for example, specific gravity values of the semiconductor ceramic composition powder and the organic polymer component, and weight values of the semiconductor ceramic composition powder and the organic polymer component contained in the thermistor layer. The specific gravity of the semiconductor ceramic composition powder can be measured by, for example, an absolute specific gravity measuring method. The specific gravity of the organic polymer component can be measured by, for example, Archimedes' method.

Alternatively, the value of PVC can also be evaluated by digging the organic-inorganic composite NTC thermistor with a method such as an ion focus beam (FIB) to expose a cross section of the thermistor layer, dividing the exposed surface into a region occupied by the semiconductor ceramic composition powder and a region occupied by the organic polymer component, calculating areas of each of the regions (referred to as "area of semiconductor ceramic composition powder" and "area of organic polymer component," respectively), and making a calculation with the following formula:

$$PVC\ (\%) = \frac{\begin{pmatrix} \text{area of semiconductor ceramic} \\ \text{composition powder} \end{pmatrix}}{\begin{pmatrix} \text{area of semiconductor ceramic} \\ \text{composition powder} \end{pmatrix} + (\text{area of organic polymer component})} \times 100$$

The organic polymer component contained in the thermistor layer has a function to impart the flexibility to the thermistor layer. The composition of the organic polymer component can be adjusted appropriately so that the desired flexibility resistance and adhesion to the electrode wire can be obtained. The organic polymer component preferably includes a thermoset resin. When the organic polymer component includes the thermoset resin, the organic polymer component is cured and shrunk upon thermal curing, causing the semiconductor ceramic composition powder to be pressed against each other. This allows the connection between the semiconductor ceramic composition powders in the thermistor layer to be formed furthermore efficiently, and allows the conductive path to be formed furthermore efficiently. As a result, the organic-inorganic composite NTC thermistor having a smaller variation in B constant can be obtained. In addition, when the organic polymer component includes the thermoset resin, the resistance value of the organic-inorganic composite NTC thermistor can be reduced since the conductive path can be formed furthermore efficiently in the thermistor layer. The thermoset resin which can be used includes, for example, epoxy resins, epoxy acrylate resins, phenol novolac-type epoxy resins, phenol resins, urethane resins, silicone resins, polyamide resins, polyimide resins and the like. As the thermoset resin, either one of the above-described resins may be used alone, or two or more of them may be used in combination. The thermoset resin is preferably an epoxy resin. The connection between the semiconductor ceramic composition powders can be formed furthermore efficiently by use of the epoxy resin since the epoxy resin has relatively large volume shrinkage ratio. As a result, the organic-inorganic composite NTC thermistor having furthermore smaller variation in B constant can be obtained.

Alternatively, the organic polymer component may include a thermoplastic resin. The thermoplastic resin which can be used includes, for example, thermoplastic resins such as polyethylene, polypropylene, polyvinyl chloride, polystyrene, polyvinyl acetate, acryl and polyester; polyvinyl acetal resins; polyvinyl butyral resins; fluorine-based resins; liquid crystal polymers; polyphenyl sulfide resins; diallyl phthalate resins; polyvinyl alcohol resins; epoxy resins to which no curing agent is added; phenoxy resins to which no curing agent is added; and the like. As the thermoplastic resin, either one of the above-described resins may be used alone, or two or more of them may be used in combination. When the organic polymer component includes the thermoplastic resin, the flexibility of the thermistor layer can be furthermore improved. As a result, the occurrence of cracks or the like in the thermistor layer can be prevented furthermore effectively.

The organic-inorganic composite NTC thermistor having high B constant of 2,500 K or more can be obtained in both of the case where the thermoset resin is used as the organic polymer component and the case where the thermoplastic resin is used as the organic polymer component.

The thermoset resin and the thermoplastic resin may be used in combination as the organic polymer component. The flexibility of the thermistor layer can be improved by the combination of the thermoset resin with the thermoplastic resin.

Preferably, the organic polymer component further includes a phenoxy resin in addition to the thermoset resin or the thermoplastic resin as described above. The phenoxy resin means an epoxy resin having a repeating unit n of 100 (molecular weight: 10,000) or more, and has a property that it is flexible and soft. Therefore, when the organic polymer component includes the phenoxy resin in addition to the thermoset resin, the flexibility of the thermistor layer is furthermore improved, and the occurrence of cracks or the like in the thermistor layer can be prevented furthermore effectively. The larger the thickness of the thermistor layer is, the more readily cracks tend to occur in the thermistor layer. Therefore, when the thickness of the thermistor layer is relatively large, the effect of adding the phenoxy resin as described above is more remarkable. The organic polymer component preferably includes, for example, the epoxy resin and the phenoxy resin. CTBN-modified epoxy resins, modified silicone resins, rubber components soluble in a solvent (such as fluorine-containing rubbers) and the like may also be added to the organic polymer component in place of or in addition to the phenoxy resin, in order to impart the flexibility to the thermistor layer.

The organic polymer component may further include phthalic acid esters, adipic acid esters, aliphatic dibasic acid esters and the like as a plasticizer for imparting flexibility to the thermistor layer. The organic polymer component may also include a dispersing agent for improving the dispersibility of the semiconductor ceramic composition powder, a conductive auxiliary agent for decreasing the resistance of the entire thermistor layer and the like in addition to the above-described components.

The thermistor layer preferably has a thickness of 200 μm or less. When the thermistor layer has a thickness of 200 μm or less, the occurrence of cracks or the like can be furthermore prevented, and excellent flexibility can be obtained. The thermistor layer more preferably has a thickness of 5 μm to 50 μm.

The composition of the electrode layers is not particularly limited as long as the electrode layers exhibit good adhesion to the transistor and have a conductivity. The electrode layers may include, for example, gold, or may also consist of gold. Thicknesses of the electrode layers can be appropriately set depending on an application of the temperature sensor and so on. The electrode layers may have a thickness of, for example, 5 nm to 200 nm. The electrode layers preferably have a thickness of 20 nm to 100 nm.

(Transistor)

The transistor used in the temperature sensor according to the present embodiment is preferably an organic transistor. Since the organic transistor itself has flexibility, the flexibility of the temperature sensor can be furthermore improved by use of the organic transistor. A type of the organic transistor is not particularly limited, and the organic transistor may be, for example, a field-effect transistor.

The organic transistor may include a gate electrode layer, a gate insulating film, an organic semiconductor layer, a source electrode layer and a drain electrode layer. The organic semiconductor layer preferably includes dinaphthothienothiophene. The organic transistor may have a structure similar to that of the transistor 20 shown in FIG. 1, for example. However, the structure of the organic transistor is not limited to such a structure, and the organic transistor may have any suitable structure. The organic transistor may have a structure such as a bottom gate/bottom contact structure, a top gate/bottom contact structure, a bottom gate/top contact structure, a top gate/top contact structure, for example.

A metal film of Au, Ag, Al, Cr, Cu, Mo or the like, or an organic conductive thin film of PEDOT:PSS (PEDOT: poly (3,4-ethylenedioxythiophene), PSS: polystyrenesulfonic acid) or the like may be used as the gate electrode layer, the source electrode layer and the drain electrode layer. A polymer resin such as parylene, amorphous fluorine resin, benzocyclobutene, polyimide, styrene-based resin, acryl-based resin and olefin-based resin may be used as the gate insulating film. Dinaphthothienothiophene, pentacene, thienothiophene, diketopyrrolopyrrole-thienothiophene polymer or the like may be used as the organic semiconductor layer.

[Method for Manufacturing Temperature Sensor]

An example of a method for manufacturing the temperature sensor according to one embodiment of the present disclosure will be described below. However, the method for manufacturing the temperature sensor according to the present disclosure is not limited to the manufacturing method described below.

First, the transistor is formed on a flexible base material by procedures described below. A substrate such as a glass substrate is prepared. The substrate is washed with a solvent such as isopropyl alcohol (IPA) and acetone, and then dried. Wastes on a surface of the substrate is removed by, for example, blowing of nitrogen gas against the surface.

A peeling agent is applied on the substrate and dried. A heat treatment may be performed to fix the peeling agent. A film of parylene (registered trademark) is formed by a chemical vapor polymerization method (CVD method) or the like on the substrate on which the peeling agent has been applied, and thus, a flexible base material is prepared.

The transistor is prepared on the flexible base material. A method of preparing the organic transistor by a vacuum deposition method will be described here. First, a film of gold is formed as the gate electrode layer on the flexible base material by the vacuum deposition method. Then, a surface of the gate electrode is cleaned by irradiation of oxygen plasma. Then, a film of parylene is formed as the gate insulating film by the chemical vapor polymerization method (CVD method). Next, a film of dinaphthothienothiophene (DNTT) is formed as the organic semiconductor layer. Films of gold are formed thereon as the source electrode layer and the drain electrode layer by the vacuum deposition method. Then, an aging treatment is performed to improve yield. A film of parylene is formed thereon as an intermediate protective layer. A via hole is formed in the intermediate protective layer by a laser processing method in order to connect the source electrode layer of the transistor to the electrode layer of the organic-inorganic composite NTC thermistor.

Next, the organic-inorganic composite NTC thermistor is formed on the transistor. A method for manufacturing the organic-inorganic composite NTC thermistor generally includes a step of grinding a raw material mixture, a step of heat-treating the raw material mixture to obtain a semiconductor ceramic composition, a step of grinding the semiconductor ceramic composition to obtain semiconductor ceramic composition powder, a step of obtaining a thermistor layer paste containing the semiconductor ceramic composition powder and an organic polymer component, and a step of forming electrode layers and a thermistor layer on the transistor to obtain an organic-inorganic composite NTC thermistor.

First, the raw material mixture containing powder of Mn source, Ni source and Fe source is ground. As the Mn source, $Mn_3O_4$, $MnCO_3$ or the like may be used, for example. As the Ni source, NiO, $NiCO_3$ or the like may be used, for example. As the Fe source, $Fe_2O_3$ or the like may be used, for example. Each of these raw materials is weighed in such a manner that the molar ratio of Mn to Ni is 85/15≥Mn/Ni≥65/35 and that the Fe content is 30 parts by mole or less when the total molar amount of Mn and Ni is regarded as 100 parts by mole, and thus, the raw material mixture is obtained. A composition ratio of each element in the raw material mixture can be regarded as substantially the same as the composition ratio of each element in the semiconductor ceramic composition powder contained in the thermistor layer of the obtained organic-inorganic composite NTC thermistor. The raw material mixture is ground. A method of grinding the raw material mixture is not particularly limited. For example, the raw material mixture may be wet-ground with grinding media (such as grinding media made of zirconia) by use of a ball mill.

The raw material mixture which has been ground in this manner is heat-treated at a temperature of 700° C. to 900° C., and thus, the semiconductor ceramic composition is obtained. In the method according to the present embodiment, since the ratio of the elements constituting the raw material mixture is designed as described above, the semiconductor ceramic composition having a spinel structure and large B constant can be obtained even if the heat treatment temperature is relatively low of less than 1,000° C. Furthermore, since the semiconductor ceramic composition obtained by the above-described heat treatment contains a small amount of heterogeneous phase, the variation in B constant of the obtained organic-inorganic composite NTC thermistor can be reduced. The heat treatment is preferably performed in an air atmosphere. The heat treatment in the air atmosphere can prevent a growth of particles of the semiconductor ceramic composition. Alternatively, the heat treatment may be performed under a nitrogen atmosphere or an oxygen atmosphere when it is desired to prevent the formation of the heterogeneous phase or the like. When the heat treatment is performed with changing the atmosphere, oxygen partial pressure may be appropriately changed for obtaining a desired semiconductor ceramic composition.

The semiconductor ceramic composition is ground, and thus, the semiconductor ceramic composition powder having an average particle diameter of 2 μm or less is obtained. In the method according to the present embodiment, since the heat treatment of the semiconductor ceramic composition is performed at a relatively low temperature, the hardness of the obtained semiconductor ceramic composition can be reduced. Therefore, the semiconductor ceramic composition can be made into fine particles by grinding, and the semiconductor ceramic composition powder having an average particle diameter of 2 μm or less can be obtained. A method of grinding the semiconductor ceramic composition is not particularly limited. For example, the semiconductor ceramic composition may be wet-ground by a ball mill method, or may also be dry-ground. An additive such as the dispersing agent may be blended into the semiconductor ceramic composition if necessary at the time of grinding. The semiconductor ceramic composition powder obtained by the grinding may be dried in some cases. An average particle diameter of the semiconductor ceramic composition powder (the semiconductor ceramic composition powder as the raw material) before being mixed with the organic polymer component and the like for preparing the thermistor layer paste can be evaluated by a laser diffraction/scattering method, and is expressed as a median diameter (D50). The average particle diameter of the semiconductor ceramic composition powder as the raw material can be regarded as the same as the average particle diameter of the semiconductor ceramic composition powder present in the thermistor layer of the organic-inorganic composite NTC thermistor in a finished product.

The semiconductor ceramic composition powder as the raw material preferably has a specific surface area of 2 $m^2/g$ to 12 $m^2/g$. When the specific surface area is 2 $m^2/g$ or more, the connection between the semiconductor ceramic composition powders can be formed efficiently in the thermistor layer, and the conductive path (percolation path) can be formed efficiently in the thermistor layer. As a result, the organic-inorganic composite NTC thermistor having excellent thermistor characteristics can be obtained even when the content of the semiconductor ceramic composition powder in the thermistor layer is small. Furthermore, when the specific surface area is 2 $m^2/g$ or more, the variation in B constant can be reduced. Specifically, the organic-inorganic composite NTC thermistor having B constant of 2,500 K or more and the variation in B constant of within ±2.5% can be obtained, for example. When the specific surface area is 12 $m^2/g$ or less, the semiconductor ceramic composition powder can be efficiently dispersed in the thermistor layer, and the occurrence of the coarse aggregate can be prevented. The specific surface area of the semiconductor ceramic composition powder can be measured by the gas adsorption method. The specific surface area of the semiconductor ceramic composition powder before the preparation of the thermistor layer paste can be regarded as the same as the specific surface area of the semiconductor ceramic composition powder present in the thermistor layer of the organic-inorganic composite NTC thermistor in a finished product.

In addition, when the semiconductor ceramic composition powder has a specific surface area of 2 $m^2/g$ or more, the content of the semiconductor ceramic composition powder in the thermistor layer can be reduced, and thus, the content of the organic polymer component in the thermistor layer can be increased. As a result, the flexibility of the thermistor layer is improved. Therefore, even when the temperature sensor is bent, the occurrence of cracks or the like in the thermistor layer can be prevented, while the temperature sensor can still serve as the temperature sensor. Furthermore, when the specific surface area is 2 $m^2/g$ or more, the thickness of the thermistor layer can be decreased, and thus, the flexibility of the thermistor layer can be furthermore improved. In addition, when the specific surface area is 2 $m^2/g$ or more, it is possible to form the thermistor layer by the printing technique such as screen printing.

The semiconductor ceramic composition powder thus obtained is mixed with the organic polymer component, and thus the thermistor layer paste containing the semiconductor ceramic composition powder and the organic polymer component is obtained. It is preferable to set a ratio of the semiconductor ceramic composition powder and the organic polymer component in such a manner that the PVC of the semiconductor ceramic composition powder is within the range of 30% to 70%. The thermistor layer paste may be mixed by, for example, kneading with a mortar, a three-roll mill or the like. The aggregates which may be contained in the obtained thermistor paste may be removed by passing of the paste through a sieve such as a stainless steel mesh. An aperture of the mesh can be appropriately selected depending on a size of the aggregates to be removed. Furthermore, a viscosity of the thermistor layer paste may be adjusted to a viscosity suitable for the printing by addition of a solvent to the thermistor layer paste and stirring thereof. A stirring method is not particularly limited as long as it enables uniform stirring of the thermistor layer paste and the solvent. For example, the stirring may be performed by use of a rotation-revolution-type stirring-defoaming machine. The solvent which may be used includes, for example, ethylene glycol, cellosolve, carbitol, butyl carbitol, butyl carbitol acetate, dipropylene glycol methyl ether acetate and the like. An amount of the solvent to be added can be appropriately adjusted depending on desired viscosity of the thermistor layer paste. The content ratio of the semiconductor ceramic composition powder and the organic polymer component in the thermistor layer paste can be regarded as substantially the same as the content ratio of the semiconductor ceramic composition powder and the organic polymer component in the thermistor layer of the obtained organic-inorganic composite NTC thermistor.

Then, the electrode layers and the thermistor layer of the organic-inorganic composite NTC thermistor are formed on the transistor. A case of forming the organic-inorganic composite NTC thermistor having the structure shown in FIGS. 5A to 5C is mainly described here. First, films of gold are formed as comb-shaped electrodes of the organic-inorganic composite NTC thermistor on the intermediate protective layer described above. The source electrode of the organic transistor thereby has an electrical connection with one of the comb-shaped electrodes of the organic-inorganic composite NTC thermistor through the via hole.

The thermistor layer paste is applied on the comb-shaped electrodes by printing or the like, and then subjected to a heat treatment. The thickness of the thermistor layer and conditions of the heat treatment can be appropriately adjusted depending on the thickness of the thermistor layer to be formed and the composition of the thermistor layer paste. The heat treatment may be performed in, for example, a hot air oven. The heat treatment after the printing of the thermistor layer paste may be performed at a temperature at which the thermistor layer is sufficiently fixed, for example.

When the organic polymer component contained in the thermistor layer is the thermoset resin, it is preferable to perform the heat treatment at a temperature equal to or more than the curing temperature of the thermoset resin. In each of the heat treatments, the electrode layer paste and/or the thermistor layer paste may be dried at a relatively low temperature, and then further heated at a temperature higher than the drying temperature.

A film of parylene may be formed as a sealing protective layer on the organic-inorganic composite NTC thermistor thus formed. Finally, the temperature sensor is peeled off from the substrate, and thus, a film-like flexible temperature sensor is obtained.

Examples

A temperature sensor was manufactured by procedures described below.

(Cleaning and Peeling Treatment of Glass Substrate)

A glass substrate was washed with IPA and acetone, and then dried at 120° C. for 10 minutes. Wastes such as dusts were removed from the substrate by blowing of nitrogen gas against the surface of the substrate. A peeling agent was applied on the substrate by a spin coating method, and then dried. The substrate was subjected to the heat treatment at 120° C. for one hour for fixing the peeling agent. A film of parylene having a thickness of 5 µm was formed on the glass substrate on which the peeling agent was applied by the chemical vapor polymerization method (CVD method), and thus a flexible base material for the film temperature sensor was prepared.

(Preparation of Organic Transistors)

A total of 144 active matrix-type organic transistors of 12 in a vertical direction×12 in a horizontal direction were prepared on the flexible base material by a vacuum deposition method. First, films of gold having a thickness of 50 nm were formed on the flexible base material as the gate electrode layers by the vacuum deposition method. Then, the surfaces of the gate electrode layers were cleaned by irradiating the surfaces of the gate electrode layers with oxygen plasma. Thereafter, films of parylene having a thickness of 250 nm were formed as the gate insulating films by the chemical vapor polymerization method (CVD method). Then, films of DNTT having a thickness of 20 nm were formed as the organic semiconductor layers. Films of gold having a thickness of 50 nm were formed as the source electrode layers and the drain electrode layers by the vacuum deposition method. Then, the aging treatment was performed for improving yield. Films of parylene having a thickness of 2 µm were formed thereon as the intermediate protective layers. Via holes were formed in the intermediate protective layers by the laser processing method.

(Preparation of Organic-Inorganic Composite NTC Thermistors)

Films of comb-shaped electrodes of the organic-inorganic composite NTC thermistors having a thickness of 50 nm were formed with gold on the intermediate protective layers. The source electrode layers of the organic transistors thereby have electrical connections with the comb-shaped electrodes of the organic-inorganic composite NTC thermistors through the via holes.

A paste to be the organic NTC thermistor layers was printed on the comb-shaped electrodes, and then subjected to the heat treatment at 150° C. for one hour. Films of parylene having a thickness of 2 µm were formed thereon as the sealing protective layers by the CVD method. Finally, the temperature sensor was peeled off from the glass substrate, and thus a film-like flexible temperature distribution sensor was completed.

(Evaluation of Temperature Sensor)

Figure 6A:
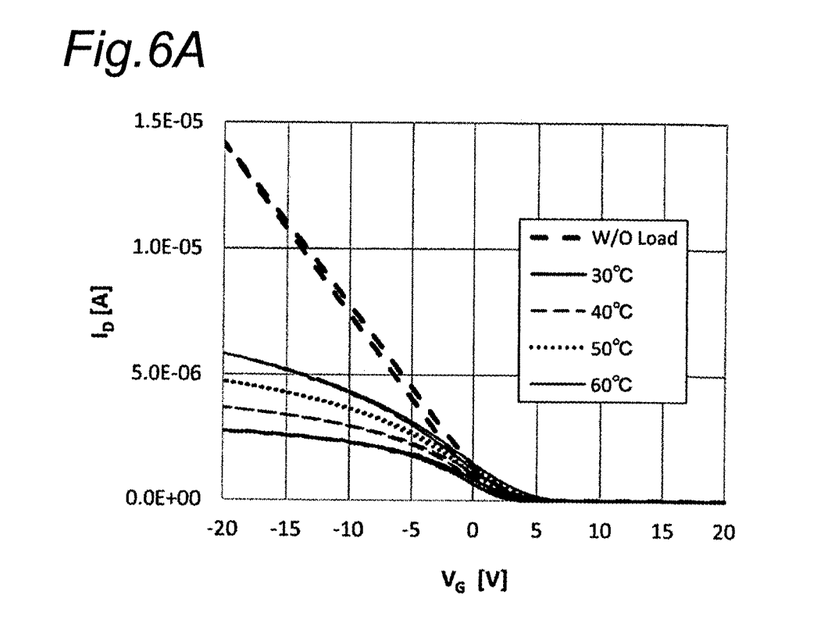
FIGS. 6A and 6B are diagrams showing measurement results of drain currents of a transistor in a temperature sensor.
Figure 6B:
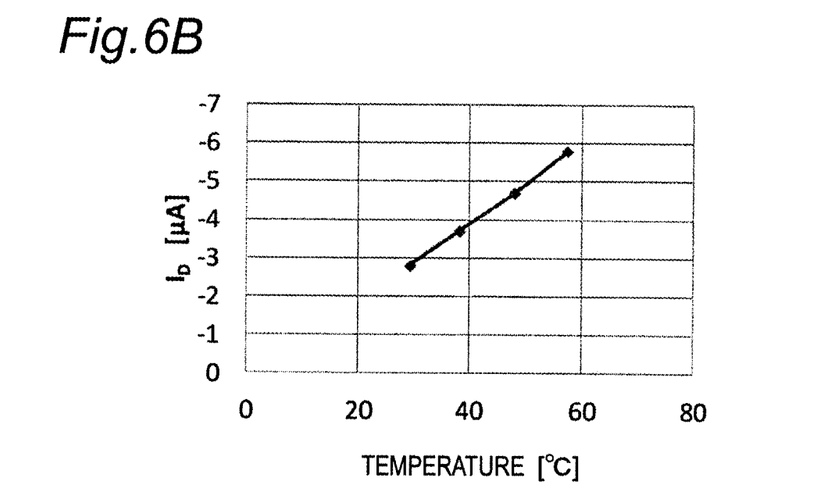

The flexible temperature distribution sensor was placed on a hot plate set at 30 to 60° C. A voltage of −1 V was applied between the source electrode and the drain electrode of the organic transistor, and a drain current (a current flowing between the source electrode and the drain electrode) $I_D$ was measured while a voltage $V_G$ between the source electrode and the gate electrode was swept from +20 V to −20 V. The results are shown in FIGS. 6A and 6B. In FIG. 6A, "W/O Load" indicates the result of the measurement of the organic transistor alone. FIG. 6B shows the drain current value $I_D$ when the gate voltage $V_G$ was fixed to −20 V. As shown in FIGS. 6A and 6B, the drain currents changing with the temperature were observed. This is because the resistance value of the organic-inorganic composite NTC thermistor was decreased with increase in the temperature, and thereby the amount of the drain current of the organic transistor was increased. The temperature could be determined by measuring the amount of the drain current in this manner.

The temperature sensor according to the present disclosure has excellent flexibility and high reliability, and thus can be used in a wide variety of fields such as medical applications.

REFERENCE NUMERALS LIST 1, 100 Temperature sensor
10 Organic-inorganic composite negative temperature coefficient thermistor
11 Electrode layer
12 Electrode layer
13 Thermistor layer
20 Transistor
21 Source electrode
22 Drain electrode

What is claimed is:

1. A temperature sensor comprising:
an organic-inorganic composite negative temperature coefficient thermistor that comprises:
a thermistor layer which comprises spinel-type semiconductor ceramic composition powder containing Mn, Ni and Fe and an organic polymer component, wherein the semiconductor ceramic composition powder has a molar ratio of Mn to Ni of 85/15≥Mn/Ni≥65/35 and a Fe content of 30 parts by mole or less when a total molar amount of Mn and Ni is regarded as 100 parts by mole, the semiconductor ceramic composition powder having a peak with a local maximum value of 29° to 31° in its x-ray diffraction pattern, a half width of which peak is 0.15 or more, and
a pair of electrode layers; and
a transistor electrically connected with either one of the pair of electrode layers of the organic-inorganic composite negative temperature coefficient thermistor.

2. The temperature sensor according to claim 1, wherein the transistor is an organic transistor.

3. The temperature sensor according to claim 2, wherein the organic transistor comprises a gate electrode layer, a gate insulating film, an organic semiconductor layer, a source electrode layer and a drain electrode layer.

4. The temperature sensor according to claim 1, wherein the semiconductor ceramic composition powder has an average particle diameter of 2 μm or less.

5. The temperature sensor according to claim 4, wherein the average particle diameter is 0.4 μm to 1.5 μm.

6. The temperature sensor according to claim 4, wherein a volume percentage of the semiconductor ceramic composition powder in the thermistor layer is 30% by volume to 70% by volume.

7. The temperature sensor according to claim 1, wherein the semiconductor ceramic composition powder further comprises one or more selected from Co, Ti and Al, and
wherein a sum of the Co, Ti and Al is 2.0 parts by mole to 60 parts by mole when the total molar amount of Mn and Ni is regarded as 100 parts by mole.

8. The temperature sensor according to claim 1, wherein the semiconductor ceramic composition powder has a specific surface area of 2 m²/g to 12 m²/g.

9. The temperature sensor according to claim 1, wherein a volume percentage of the semiconductor ceramic composition powder in the thermistor layer is 30% by volume to 70% by volume.

10. The temperature sensor according to claim 1, wherein the organic polymer component comprises a thermoset resin.

11. The temperature sensor according to claim 10, wherein the thermoset resin is one or more resins selected from an epoxy resin, an epoxy acrylate resin, a phenol novolac-type epoxy resin, a phenol resin, an urethane resin, a silicone resin, a polyamide resin and a polyimide resin.

12. The temperature sensor according to claim 10, wherein the organic polymer component further comprises a phenoxy resin.

13. The temperature sensor according to claim 1, wherein the organic polymer component comprises a thermoplastic resin.

14. The temperature sensor according to claim 13, wherein the thermoplastic resin is one or more resins selected from a polyvinyl butyral resin, an epoxy resin containing no curing agent, a phenoxy resin containing no curing agent, a polyester and a polyvinyl acetate.

15. The temperature sensor according to claim 1, wherein the thermistor layer has a thickness of 200 μm or less.

16. The temperature sensor according to claim 15, wherein the thickness of the thermistor layer is 5 μm to 50 μm.

17. A temperature sensing device comprising:
a substrate;
a plurality of x-electrodes and a plurality of y-electrodes arranged crosswise in a matrix form on the substrate; and
a plurality of the temperature sensors according to claim 1,
wherein the plurality of temperature sensors are respectively arranged in a vicinity of each one of intersections of the x-electrodes and the y-electrodes, and
wherein each of the respective transistors of the plurality of temperature sensors are electrically connected with one of the x-electrodes and one of the y-electrodes.

18. The temperature sensing device according to claim 17, further comprising a reading unit for reading a change in a resistance value of the organic-inorganic composite negative temperature coefficient thermistor of each of the plurality of temperature sensors, and a radio communication unit for transmitting information read by the reading unit.

19. The temperature sensing device according to claim 17, wherein the semiconductor ceramic composition powder has an average particle diameter of 2 μm or less.

20. The temperature sensing device according to claim 17, wherein a volume percentage of the semiconductor ceramic composition powder in the thermistor layer is 30% by volume to 70% by volume.

* * * * *